(12) United States Patent
Luan et al.

(10) Patent No.: US 10,692,040 B2
(45) Date of Patent: Jun. 23, 2020

(54) INFORMATION PROCESSING METHOD, SERVER, AND LOGISTICS TERMINAL

(71) Applicant: Huawei Technologies Co., Ltd., Shenzhen (CN)

(72) Inventors: Jiangyi Luan, Shenzhen (CN); Zijun Li, Shenzhen (CN); Ning Piao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 1077 days.

(21) Appl. No.: 14/583,948

(22) Filed: Dec. 29, 2014

(65) Prior Publication Data
US 2015/0112886 A1 Apr. 23, 2015

Related U.S. Application Data

(63) Continuation of application No. PCT/CN2013/078795, filed on Jul. 4, 2013.

(30) Foreign Application Priority Data

Jul. 5, 2012 (CN) .......................... 2012 1 0231190

(51) Int. Cl.
G06Q 10/08 (2012.01)
G06Q 50/28 (2012.01)

(52) U.S. Cl.
CPC ....... G06Q 10/08355 (2013.01); G06Q 10/08 (2013.01); G06Q 10/0833 (2013.01); G06Q 50/28 (2013.01)

(58) Field of Classification Search
CPC ........ G06Q 10/08; G06Q 50/28; G06Q 50/30; G06Q 50/32
See application file for complete search history.

(56) References Cited

U.S. PATENT DOCUMENTS 6,618,593 B1 9/2003 Druthman et al.
6,980,131 B1 12/2005 Taylor
(Continued)

FOREIGN PATENT DOCUMENTS

CN 102521720 A 6/2012
CN 102521755 A 6/2012
(Continued)

OTHER PUBLICATIONS

Ichoua, Soumia, Michel Gendreau, and Jean-Yves Potvin. "Vehicle dispatching with time-dependent travel times." European journal of operational research 144.2 (2003): 379-396.*
(Continued)

Primary Examiner — Shannon S Campbell
Assistant Examiner — Scott M Tungate
(74) Attorney, Agent, or Firm — Conley Rose, P.C.

(57) ABSTRACT

An information processing method, a server, and a logistics terminal are provided. The information processing method includes receiving a query request sent by a logistics terminal; determining, in at least one prestored order, target order information that corresponds to an authentication identifier and includes a delivery address within a delivery distance threshold range that uses a current location of the logistics terminal as a center; feeding back the determined target order information to the logistics terminal; and pushing online prompt information to a corresponding ordering user terminal according to the ordering user account in the target order after an arrival notice instruction sent by the logistics terminal is received. It can be seen that, in this solution, the objectives are achieved of improving goods delivery efficiency and reducing a delivery cost.

14 Claims, 5 Drawing Sheets

(56) References Cited

U.S. PATENT DOCUMENTS

| | | | |
|---|---|---|---|
| 8,015,023 B1* | 9/2011 | Lee | G06Q 10/063114 700/226 |
| 2003/0146854 A1 | 8/2003 | Jones | |
| 2006/0010037 A1* | 1/2006 | Angert | G06Q 10/087 705/15 |
| 2007/0192111 A1* | 8/2007 | Chasen | G06Q 10/08 705/335 |
| 2010/0041418 A1 | 2/2010 | Edge et al. | |
| 2010/0131769 A1 | 5/2010 | Homma | |
| 2011/0179064 A1 | 7/2011 | Russo | |
| 2013/0086615 A1* | 4/2013 | Williams | H04N 21/41407 725/62 |
| 2013/0173424 A1* | 7/2013 | Kwon | G06Q 50/01 705/26.35 |

FOREIGN PATENT DOCUMENTS

| | | |
|---|---|---|
| CN | 102542429 A | 7/2012 |
| CN | 102542495 A | 7/2012 |
| CN | 102779300 A | 11/2012 |
| EP | 2189930 A1 | 5/2010 |
| JP | H09035192 A | 2/1997 |
| JP | 2004091150 A | 3/2004 |
| JP | 2004231402 A | 8/2004 |
| JP | 20050112571 A | 4/2005 |
| JP | 2009020608 A | 1/2009 |
| JP | 2010128535 A | 6/2010 |
| JP | 2012500589 A | 1/2012 |
| KR | 20070000258 A | 1/2007 |
| KR | 20070006645 A | 1/2007 |
| KR | 200800071222 A | 8/2008 |
| KR | 20110003735 A | 1/2011 |
| WO | 0165455 A2 | 9/2001 |

OTHER PUBLICATIONS

Foreign Communication From A Counterpart Application, European Application No. 13813102.4, European Notice of Rejection dated Dec. 20, 2017, 13 pages.
Foreign Communication From A Counterpart Application, European Application No. 13813102.4, Extended European Search Report dated Apr. 9, 2015, 8 pages.
Partial English Translation and Abstract of Chinese Patent Application No. CN102521720A, dated Jan. 14, 2015, 5 pages.
Partial English Translation and Abstract of Chinese Patent Application No. CN102779300A, Part 1, dated Jan. 14, 2015, 7 pages.
Partial English Translation and Abstract of Chinese Patent Application No. CN102779300A, Part 2, dated Jan. 14, 2015, 4 pages.
Foreign Communication From A Counterpart Application, Chinese Application No. 201210231190.9, Chinese Office Action dated Feb. 3, 2015, 10 pages.
Foreign Communication From A Counterpart Application, PCT Application No. PCT/CN2013/078795, English Translation of International Search Report dated Oct. 17, 2013, 3 pages.
Foreign Communication From A Counterpart Application, PCT Application No. PCT/CN2013/078795, English Translation of Written Opinion dated Oct. 17, 2013, 11 pages.
Foreign Communication From A Counterpart Application, Japanese Application No. 2015-518823, Japanese Notice of Allowance dated Dec. 18, 2015, 3 pages.
Foreign Communication From A Counterpart Application, Australian Application No. 2013286389, Australian Office Action dated Aug. 28, 2015, 7 pages.
Foreign Communication From A Counterpart Application, Korean Application No. 10-2015-7000535, Korean Office Action dated Jan. 15, 2016, 8 pages.
Foreign Communication From A Counterpart Application, Korean Application No. 10-2015-7000535, English Translation of Korean Office Action dated Jan. 15, 2016, 5 pages.

* cited by examiner

INFORMATION PROCESSING METHOD, SERVER, AND LOGISTICS TERMINAL

CROSS-REFERENCE TO RELATED APPLICATIONS

This application is a continuation of International Application No. PCT/CN2013/078795, filed on Jul. 4, 2013, which claims priority to Chinese Patent Application No. 201210231190.9, filed on Jul. 5, 2012, both of which are hereby incorporated by reference in their entireties.

TECHNICAL FIELD

The present invention relates to the field of information processing technologies, and in particular, to an information processing method, a server, and a logistics terminal.

BACKGROUND

With the continuous development of electronic commerce (e-commerce), more and more people get used to online shopping, and with enhanced performance of mobile phones, wireless e-commerce also begins to flourish. Mainstream e-commerce websites provide user clients for mobile phone users, and a user can shop online by using a user client.

In the prior art, during goods delivery, a logistics person needs to communicate with a user by phone, so as to instruct the user to pick up goods at a corresponding delivery place. However, during massive delivery, when arriving at a logistics distribution place, the logistics person needs to instruct each ordering user by phone to pick up goods at a corresponding delivery place, which results in low delivery efficiency and a high cost.

Therefore, how to improve goods delivery efficiency and reduce a delivery cost during goods delivery is a problem to be solved by the present invention.

SUMMARY

To solve the technical problem described above, embodiments of the present invention provide an information processing method, a server, and a logistics terminal, so as to improve goods delivery efficiency and reduce a delivery cost. Technical solutions are as follows.

According to one aspect, an embodiment of the present invention provides an information processing method, including receiving a query request sent by a logistics terminal, where the query request carries current location information, a delivery distance threshold, and an authentication identifier that correspond to the logistics terminal; determining, in at least one prestored order, target order information that corresponds to the authentication identifier and includes a delivery address within a delivery distance threshold range that uses a current location of the logistics terminal as a center, where the order includes a corresponding ordering user account and delivery address when an ordering user places the order; feeding back the determined target order information to the logistics terminal; and pushing online prompt information to a corresponding ordering user terminal according to the ordering user account in the target order after an arrival notice instruction sent by the logistics terminal is received, where the online prompt information includes the current location information of the logistics terminal and logistics delivery information.

Correspondingly, an embodiment of the present invention provides a server, including a receiving module configured to receive a query request sent by a logistics terminal, where the query request carries current location information, a delivery distance threshold, and an authentication identifier that correspond to the logistics terminal; a target order determining module configured to determine, in at least one prestored order, target order information that corresponds to the authentication identifier and includes a delivery address within a delivery distance threshold range that uses a current location of the logistics terminal as a center, where the order includes a corresponding ordering user account and delivery address when an ordering user places the order; a target order feedback module configured to feed back the determined target order information to the logistics terminal; and an online information pushing module configured to push online prompt information to a corresponding ordering user terminal according to the ordering user account in the target order after an arrival notice instruction sent by the logistics terminal is received, where the online prompt information includes the current location information of the logistics terminal and logistics delivery information.

According to another aspect, an embodiment of the present invention further provides an information processing method, which may include obtaining current location information of a logistics terminal; encapsulating the current location information, an authentication identifier, and a delivery distance threshold into a query request, and sending the query request to a server; receiving target order information that is within a delivery distance threshold of a current location, where the target order information is fed back by the server and includes an ordering user account and a delivery address; and sending an arrival notice instruction to the server, where the arrival notice instruction is used to instruct the server to push online prompt information to a corresponding ordering user terminal according to the ordering user account in the target order, where the online prompt information includes the current location information of the logistics terminal and logistics delivery information.

Correspondingly, an embodiment of the present invention further provides a logistics terminal, including a current location obtaining module configured to obtain current location information of the logistics terminal; a query request processing module configured to encapsulate the current location information, an authentication identifier, and a delivery distance threshold into a query request, and send the query request to a server; a target order receiving module configured to receive target order information that is within a delivery distance threshold of a current location, where the target order information is fed back by the server and includes an ordering user account and a delivery address; and an arrival notice sending module configured to send an arrival notice instruction to the server, where the arrival notice instruction is used to instruct the server to push online prompt information to a corresponding ordering user terminal according to the ordering user account in the target order, where the online prompt information includes the current location information of the logistics terminal and logistics delivery information.

In the technical solutions provided in the embodiments of the present invention, during goods delivery, after receiving a query request sent by a logistics terminal and determining at least one target order that meets the query request, a server feeds back target order information to the logistics terminal; and after receiving an arrival notice instruction sent by the logistics terminal, the server pushes, according to an ordering user account in the target order, online prompt information that includes current location information of the logistics terminal and logistics delivery information to a corresponding ordering user terminal, so as to simultaneously instruct multiple ordering users to pick up goods at a current location of the logistics terminal. It can be seen that, in this solution, after arriving at a delivery place, a logistics person can simultaneously notify multiple ordering users in a designated delivery area by using a server to push a message to an ordering user terminal, and does not need to instruct each ordering user by phone to pick up goods, thereby achieving objectives of improving goods delivery efficiency and reducing a delivery cost.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

To effectively improve goods delivery efficiency and reduce a delivery cost during goods delivery, embodiments of the present invention provide an information n processing method, a server, and a logistics terminal.

The following first describes an information processing method provided in an embodiment of the present invention.

It should be noted that, an application precondition of the processing method provided in the present invention is that, after logging in a client of an e-commerce system by using an ordering user account, an ordering user may choose a fixed address or a location corresponding to an ordering user terminal as a delivery address when placing an order for determined goods; when the ordering user chooses the location corresponding to the ordering user terminal as the delivery address, the ordering user terminal obtains, by using a positioning apparatus, information about a location where the ordering user terminal is located, and then, sends the location information together with information about goods purchased by the ordering user, an ordering user name, remark information, the ordering user account, a communication identifier, and the like, as an order to a server; then, the server obtains the order corresponding to the ordering user account, and processes the order, for example: assigning a logistics company, assigning a logistics person, and generating a logistics document.

It can be understood that, in an actual application, the location corresponding to the ordering user terminal may be obtained by using the Global Positioning System (GPS), or obtained by using a base station positioning apparatus, which are both proper. Certainly, the positioning apparatus described in the embodiment of the present invention is merely used as an example, which should not limit this solution.

The following describes the information processing method provided in the embodiment of the present invention from the perspective of how a logistics terminal interacts with a server during goods delivery.

It can be understood that, the logistics terminal and a subsequent user terminal each may be a mobile phone, a notebook, a tablet computer, or the like.

Figure 1:
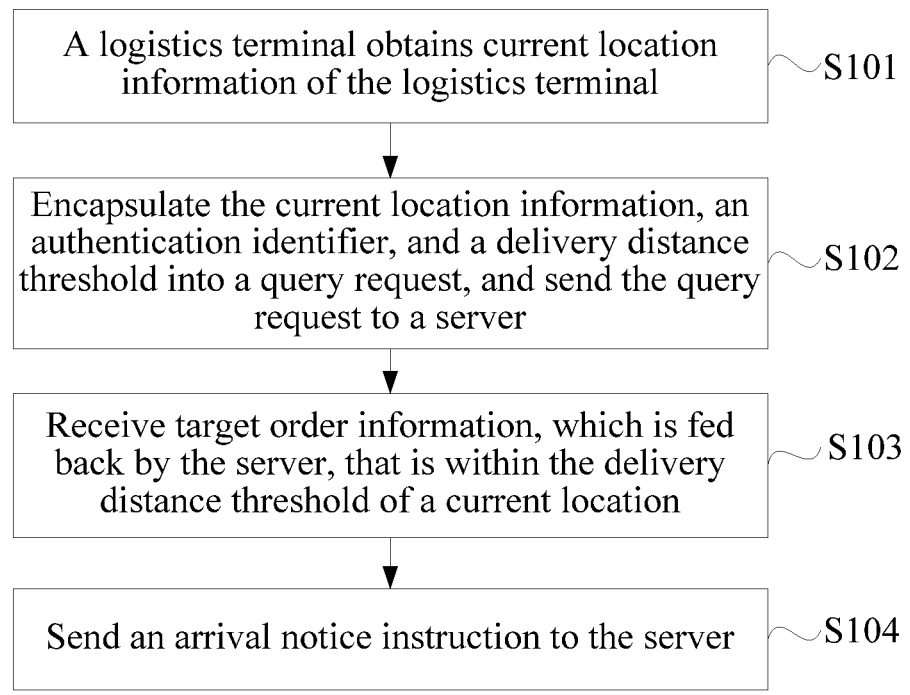
FIG. 1 is a first flowchart of an information processing method according to an embodiment of the present invention.

From the perspective of a logistics terminal, as shown in FIG. 1, an information processing method may include the following steps.

S101. The logistics terminal obtains current location information of the logistics terminal.

S102. Encapsulate the current location information, an authentication identifier, and a delivery distance threshold into a query request, and send the query request to a server.

During goods delivery, after a logistics delivery person arrives at a delivery place, when needing to query target order information which the logistics delivery person is responsible for and is within a range of a designated area of the delivery place, the logistics delivery person may log in a client of an e-commerce system by using a logistics user account of the logistics delivery person to send a query request triggering command to the server. In this case, the logistics terminal obtains the current location information of the logistics terminal, and then, encapsulates the current location information, the authentication identifier, and the delivery distance threshold into the query request, and sends the query request to the server.

The logistics terminal may obtain current location information corresponding to the logistics delivery person by using a built-in GPS module, a base station positioning apparatus, or the like; and the delivery distance threshold may be designated by the logistics terminal, and used to designate a delivery range, for example, within 500 meters from a current location.

It should be noted that, the authentication identifier is an identifier allocated by the server to the logistics terminal or the logistics delivery person, and is uniquely corresponding to the logistics terminal or the logistics delivery person. After receiving the query request sent by the logistics terminal, the server may authenticate the logistics terminal by using the authentication identifier in the query request. After the authentication succeeds, the server queries, according to the current location information of the logistics terminal and the delivery distance threshold, target order information that meets the query request, and after determining the target order information, returns, to the logistics terminal, the target order information that is within the delivery distance threshold of a current location of the logistics terminal.

S103. Receive information, which is fed back by the server, about a target order that is within the delivery distance threshold of a current location.

The target order information includes an ordering user account and a delivery address; and certainly, may further include information such as goods information, and a communication identifier corresponding to an ordering user terminal.

S104. Send an arrival notice instruction to the server.

The arrival notice instruction is used to instruct the server to push online prompt information to a corresponding ordering user terminal according to the ordering user account in the target order, where the online prompt information includes the current location information of the logistics terminal and logistics delivery information; and the logistics delivery information may include a name of goods purchased by the ordering user, and a current logistics status, for example, information indicating that goods are already delivered to the current location of the logistics terminal.

After receiving the target order fed back by the server, the logistics terminal may send the arrival notice instruction to the server, to instruct the server to push, by using the ordering user account, the current location information of the logistics terminal and the logistics delivery information to an ordering user terminal in the target order, so that the ordering user knows a status of ordered goods in time and picks up the goods in time.

Further, the logistics terminal analyzes the received target order, and displays, according to the order information, a delivery address corresponding to the ordering user and a current location corresponding to the logistics terminal to the logistics delivery person in a direct manner of using a map, so that the logistics delivery person knows the ordering user within the delivery distance threshold of the current location more directly.

Figure 2:
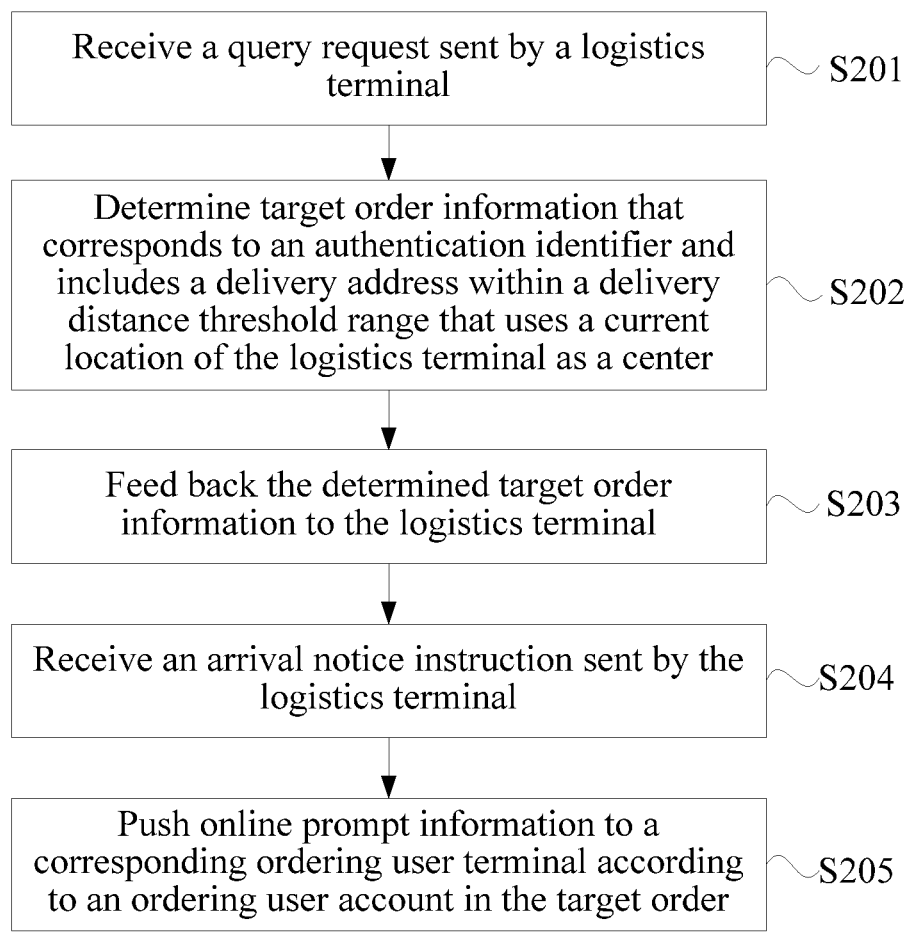
FIG. 2 is a second flowchart of an information processing method according to an embodiment of the present invention.

From the perspective of a server, as shown in FIG. 2, an information processing method may include the following steps.

S201. Receive a query request sent by a logistics terminal.

The query request carries current location information, a delivery distance threshold, and an authentication identifier that correspond to the logistics terminal.

S202. Determine, in at least one prestored order, target order information that corresponds to the authentication identifier and includes a delivery address within a delivery distance threshold range that uses a current location of the logistics terminal as a center.

The order includes a corresponding ordering user account and delivery address when an ordering user places the order; and certainly, may further include information such as goods information, and a communication identifier corresponding to an ordering user terminal.

After receiving the query request sent by a logistics delivery person by using the logistics terminal, the server needs to authenticate the logistics terminal by using the authentication identifier in the query request. After the authentication succeeds, the server screens the at least one order stored in the server to determine a target order that meets the query request.

It can be understood that, the server stores at least one order delivered by an ordering user by using the ordering user terminal, where the order includes a corresponding ordering user account and delivery address when the ordering user places the order, and certainly, further includes information such as goods information, and a communication identifier corresponding to the ordering user terminal. The delivery address in the order may be a fixed address, or a location corresponding to the ordering user terminal when the order is placed; when the ordering user has a specific shipping address, the ordering user may choose a fixed address as the delivery address; when the ordering user cannot specify a current address or shipping address, the ordering user may choose the location corresponding to the ordering user terminal as the delivery address when placing the order, and pick up the goods by using the location corresponding to the ordering user terminal.

S203. Feed back the determined target order information to the logistics terminal.

After the target order information corresponding to the query request sent by the logistics terminal is determined, the determined target order information may be sent to the logistics terminal; and the logistics terminal receives the target order information, and performs corresponding processing according to the target order information.

S204. Receive an arrival notice instruction sent by the logistics terminal.

S205. Push online prompt information to a corresponding ordering user terminal according to the ordering user account in the target order.

The online prompt information includes the current location information of the logistics terminal and logistics delivery information.

After receiving the target order fed back by the server, the logistics terminal may send the arrival notice instruction to the server, so as to instruct the server to push the current location information of the logistics terminal and the logistics delivery information to the corresponding ordering user terminal by using the ordering user account in the target order, so that the ordering user knows a status of ordered goods in time and picks up the goods in time. The server may push the online prompt information to the ordering user terminal in a form of a text message according to the ordering user account in the target order, and certainly, the form is not limited to the form of the text message.

In the technical solution provided in the embodiment of the present invention, during goods delivery, after receiving a query request sent by a logistics terminal and determining at least one target order that meets the query request, a server feeds back target order information to the logistics terminal; and after receiving an arrival notice instruction sent by the logistics terminal, the server pushes, according to an ordering user account in the target order, online prompt information that includes current location information of the logistics terminal and logistics delivery information to a corresponding ordering user terminal, so as to simultaneously instruct multiple ordering users to pick up goods at a current location of the logistics terminal. It can be seen that, in this solution, after arriving at a delivery place, a logistics person can simultaneously notify multiple ordering users in a designated delivery area by using a server to push a message to an ordering user terminal, and does not need to instruct each ordering user by phone to pick up goods, thereby achieving objectives of improving goods delivery efficiency and reducing a delivery cost.

When placing an order, the ordering user may use a location corresponding to the ordering user terminal as the delivery address because the shipping address is uncertain or the ordering user is unfamiliar with a local area; or, although the ordering user chooses the fixed address as the delivery address when placing the order, a location of the ordering user is uncertain, and in this case, during goods delivery, the delivery address of the ordering user may not match a current location of the ordering user. Therefore, to ensure goods delivery efficiency and reduce a cost, the logistics person needs to identify an ordering user whose delivery address and current location are not matched, so as to separately notify the unmatched ordering user. Therefore, the embodiment of the present invention further provides an information processing method.

Figure 3:
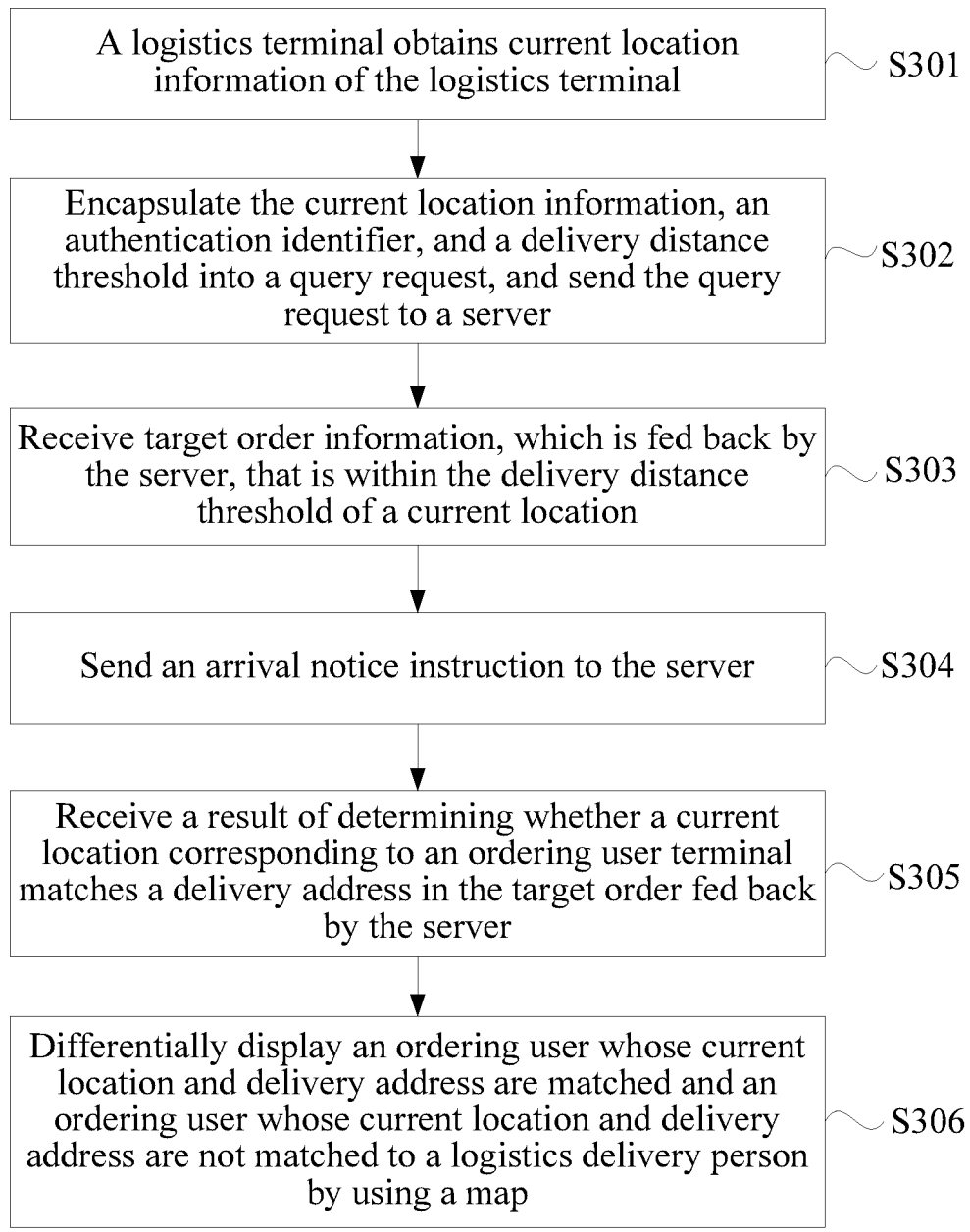
FIG. 3 is a third flowchart of an information processing method according to an embodiment of the present invention.

From the perspective of a logistics terminal, as shown in FIG. 3, an information processing method may include the following steps.

S301. The logistics terminal obtains current location information of the logistics terminal.

S302. Encapsulate the current location information, an authentication identifier, and a delivery distance threshold into a query request, and send the query request to a server.

S303. Receive information, which is fed back by the server, about a target order that is within the delivery distance threshold of a current location.

In this embodiment, step S301 to step S303 are similar to step S101 to step S103 in the foregoing embodiment, which are not repeatedly described herein.

S304. Send an arrival notice instruction to the server.

The arrival notice instruction is used to instruct the server to push online prompt information to a corresponding ordering user terminal according to the ordering user account in the target order, where the online prompt information includes the current location information of the logistics terminal, logistics delivery information, and a delivery address corresponding to the ordering user account; and the logistics delivery information may include a name of goods purchased by the ordering user, and a current logistics status, for example, information indicating that goods are already delivered to the current location of the logistics terminal.

The online prompt information sent by the server to the ordering user terminal includes the delivery address corresponding to the ordering user account, and therefore, after receiving the online prompt information pushed by the server, the ordering user terminal obtains a current location corresponding to the ordering user terminal, determines whether the current location matches the corresponding delivery address, and then feeds back a result of the determining to the server, so that the server feeds back the received result of the determining to the logistics terminal.

S305. Receive the result of the determining whether the current location corresponding to the ordering user terminal matches the delivery address in the target order fed back by the server.

S306. Differentially display an ordering user whose current location and delivery address are matched and an ordering user whose current location and delivery address are not matched to a logistics delivery person by using a map.

After the result of the determining whether the current location corresponding to the ordering user terminal matches the delivery address in the target order fed back by the server is received, an ordering user whose current location and delivery address are matched and an ordering user whose current location and delivery address are not matched may be differentially displayed to the logistics delivery person by using a map, so that the logistics delivery person directly knows whether the ordering user is within a range of a current delivery area, and separately notifies an ordering user that is not within the range of the current delivery area by using a Short Message Service (SMS) message or by phone, so that goods are delivered, or the ordering user picks up goods by himself or herself.

Figure 4:
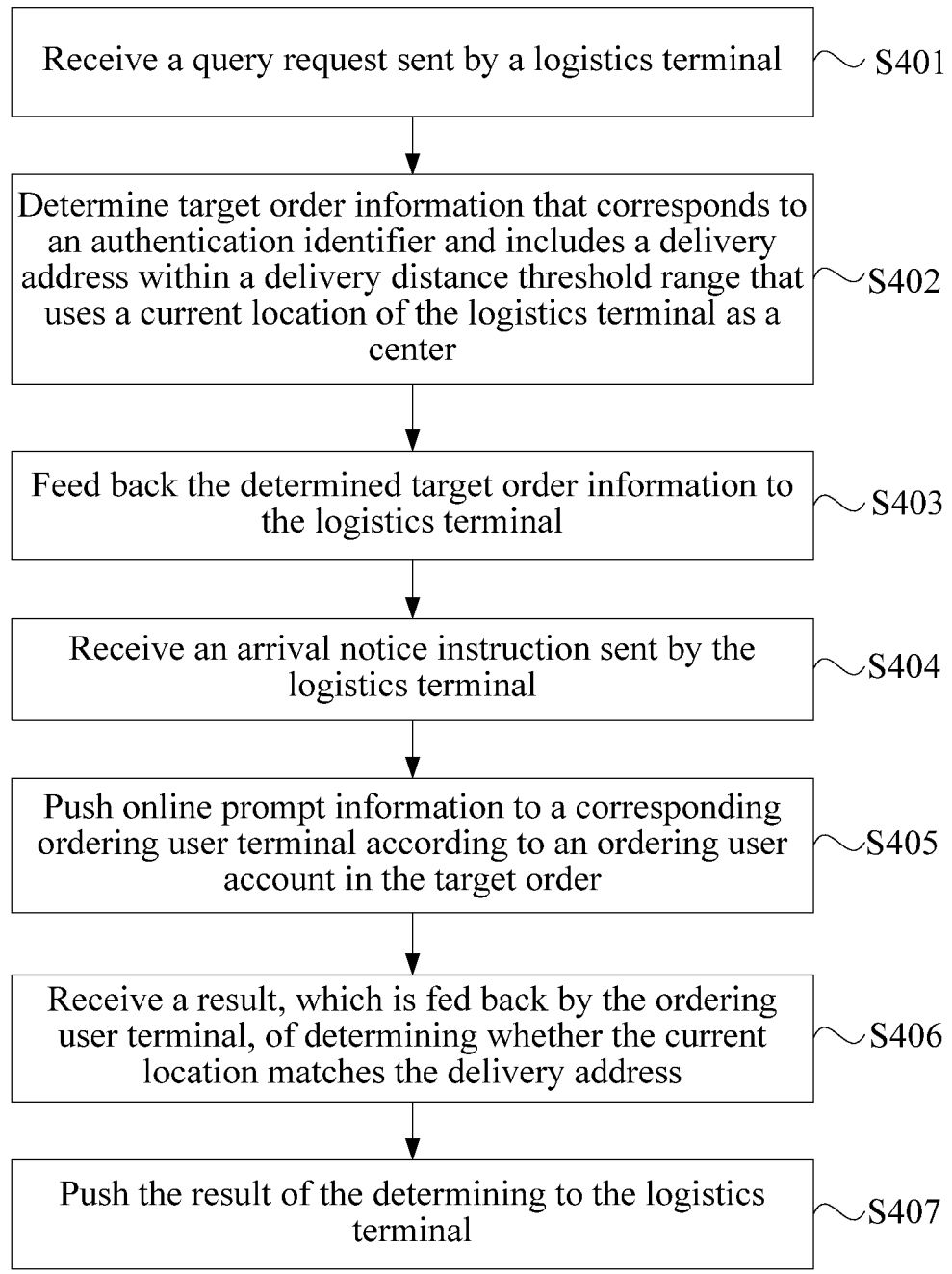
FIG. 4 is a fourth flowchart of an information processing method according to an embodiment of the present invention.

From the perspective of a server, as shown in FIG. 4, an information processing method may include the following steps.

S401. Receive a query request sent by a logistics terminal.

S402. Determine, in at least one prestored order, target order information that corresponds to the authentication identifier and includes a delivery address within a delivery distance threshold range that uses a current location of the logistics terminal as a center.

S403. Feed back the determined target order information to the logistics terminal.

In this embodiment, step S401 to step S403 are similar to step S201 to step S203 in the foregoing embodiment, which are not repeatedly described herein.

S404. Receive an arrival notice instruction sent by the logistics terminal.

S405. Push online prompt information to a corresponding ordering user terminal according to an ordering user account in the target order.

The online prompt information includes a delivery address corresponding to the ordering user account, current location information of the logistics terminal, and logistics delivery information.

After receiving the target order fed back by the server, the logistics terminal may send the arrival notice instruction to the server, so as to instruct the server to push the delivery address corresponding to the ordering user account, the current location information of the logistics terminal, and the logistics delivery information to the corresponding ordering user terminal by using the ordering user account in the target order. The server may push the online prompt information to the ordering user terminal in a form of a text message according to the ordering user account in the target order, and certainly, the form is not limited to the form of the text message.

Correspondingly, after the ordering user terminal receives the online prompt information pushed by the server, an ordering user may know a status of ordered goods in time; in addition, the online prompt information includes a delivery address corresponding to the ordering user terminal; in this case, the ordering user terminal needs to obtain a current location corresponding to the ordering user terminal, and determines whether the current location matches the corresponding delivery address, and then, feeds back a result of the determining to the server. The ordering user terminal may obtain the current location corresponding to the ordering user terminal by using a built-in GPS module, a base station positioning apparatus, or the like.

Whether the current location of the ordering user terminal matches the delivery address may be that the current location of the ordering user terminal is the same as the delivery address, or the current location of the ordering user terminal is within a specific range that uses the delivery address as a center, which are both proper.

S406. Receive the result of the determining whether the current location matches the delivery address, where the result of the determining is fed back by the ordering user terminal.

S407. Push the result of the determining to the logistics terminal.

After the result of the determining, which is fed back by the ordering user terminal, whether the current location matches the delivery address is received, the result of the determining may be pushed to the logistics terminal, so that the logistics terminal may differentially display an ordering user whose current location and delivery address are matched and an ordering user whose current location and delivery address are not matched to a logistics delivery person by using a map, so that the logistics delivery person directly knows whether the ordering user is within a range of a current delivery area, and separately notifies an ordering user that is not within the range of the current delivery area by using an SMS message or by phone, so that goods are delivered, or the ordering user picks up goods by himself or herself.

Further, after the online prompt information is sent to the ordering user terminal by using the ordering user account, an ordering user account in an offline state may be detected, that is: a client of an e-commerce system that is not logged in by using the ordering user account. Further, it is determined whether an SMS message prompt function is enabled for the offline ordering user account. For an offline ordering user account with the SMS message prompt function enabled, after the online prompt information is sent thereto, an SMS message may be further sent, by using a communication identifier included in the target order, to an ordering user terminal corresponding to the communication identifier, so as to prompt a corresponding ordering user to log in the client by using the ordering user account, and further process the online prompt information by using the corresponding ordering user terminal, and feed back the result of the determining whether the current location of the ordering user terminal matches the delivery address.

It can be understood that, the ordering user account may be offline and/or not have the SMS message prompt function enabled; as a result, the ordering user terminal cannot feed back, in time, the result of the determining whether the current location of the ordering user terminal matches the delivery address. To improve query experience of the logistics delivery person, the server may send a result of the determining that is received within a preset period of time to the logistics terminal, and neglect a result of the determining that is not received within the preset period of time. In this case, for an ordering user without a corresponding result of the determining, the logistics delivery person may consider by default that the ordering user is not within the range of the current delivery area, and notify the ordering user separately.

In this embodiment, after sending online prompt information to an ordering user terminal, a server not only can prompt a user to know a status of ordered goods in time and to pick up the goods in time, but also can instruct the ordering user terminal to determine whether a current location of the ordering user terminal matches a delivery address and to feed back a result of the determining to the server. After receiving the result of the determining fed back by the ordering user terminal, the server sends the result of the determining to a logistics terminal, so that a logistics delivery person knows whether an ordering user is within a range of a current delivery area, and separately notifies a user account that is not within the range of the current delivery area, thereby ensuring goods delivery efficiency and reducing a delivery cost.

Based on the foregoing descriptions of the method embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially, or the part contributing to the prior art may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a read-only memory (ROM), a random access memory (RAM), a magnetic disk, or an optical disc.

Figure 5:
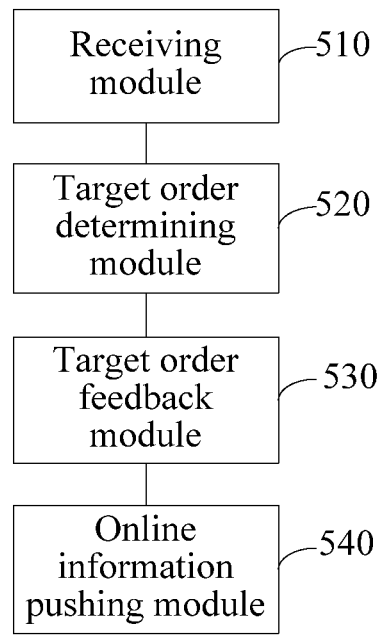
FIG. 5 is a schematic structural diagram of a server according to an embodiment of the present invention.

Corresponding to the foregoing method embodiments, an embodiment of the present invention further provides a server; as shown in FIG. 5, the server may include a receiving module 510 configured to receive a query request sent by a logistics terminal, where the query request carries current location information, a delivery distance threshold, and an authentication identifier that correspond to the logistics terminal; a target order determining module 520 configured to determine, in at least one prestored order, target order information that corresponds to the authentication identifier and includes a delivery address within a delivery distance threshold range that uses a current location of the logistics terminal as a center, where the order includes a corresponding ordering user account and delivery address when an ordering user places the order; a target order feedback module 530 configured to feed back the determined target order information to the logistics terminal; and an online information pushing module 540 configured to push online prompt information to a corresponding ordering user terminal according to the ordering user account in the target order after an arrival notice instruction sent by the logistics terminal is received, where the online prompt information includes the current location information of the logistics terminal and logistics delivery information.

During goods delivery, after receiving a query request sent by a logistics terminal and determining at least one target order that meets the query request, the server provided in the embodiment of the present invention feeds back target order information to the logistics terminal; and after receiving an arrival notice instruction sent by the logistics terminal, the server pushes, according to an ordering user account in the target order, online prompt information that includes current location information of the logistics terminal and logistics delivery information to a corresponding ordering user terminal, so as to simultaneously instruct multiple ordering users to pick up goods at a current location of the logistics terminal. It can be seen that, in this solution, after arriving at a delivery place, a logistics person can simultaneously notify multiple ordering users in a designated delivery area by using a server to push a message to an ordering user terminal, and does not need to instruct each ordering user by phone to pick up goods, thereby achieving objectives of improving goods delivery efficiency and reducing a delivery cost.

Further, the online information pushing module includes a text pushing unit configured to push the online prompt information to the ordering user terminal in a form of a text message according to the ordering user account in the target order.

Further, the online prompt information pushed by the online information pushing module further includes a delivery address corresponding to the ordering user account.

The server further includes a determining result processing module configured to receive a result of determining whether the current location matches the delivery address, where the result of the determining is fed back by the ordering user terminal; and push the result of the determining to the logistics terminal.

Figure 6:
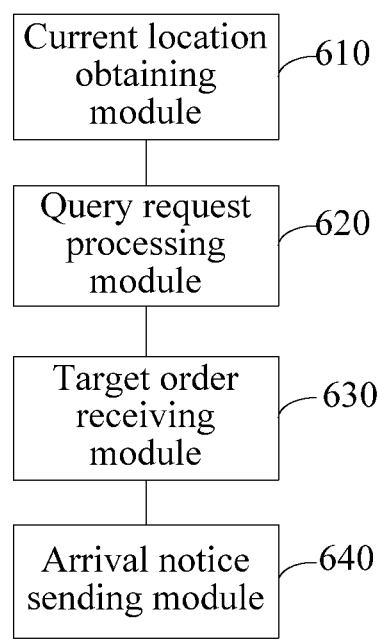
FIG. 6 is a schematic structural diagram of a logistics terminal according to an embodiment of the present invention.

An embodiment of the present invention further provides a logistics terminal; as shown in FIG. 6, the logistics terminal may include a current location obtaining module 610 configured to obtain current location information of the logistics terminal; a query request processing module 620 configured to encapsulate the current location information, an authentication identifier, and a delivery distance threshold into a query request, and send the query request to a server; a target order receiving module 630 configured to receive target order information that is within a delivery distance threshold of a current location, where the target order information is fed back by the server and includes an ordering user account and a delivery address; and an arrival notice sending module 640 configured to send an arrival notice instruction to the server, where the arrival notice instruction is used to instruct the server to push online prompt information to a corresponding ordering user terminal according to the ordering user account in the target order, where the online prompt information includes the current location information of the logistics terminal and logistics delivery information.

During goods delivery, the logistics terminal provided in the embodiment of the present invention encapsulates the current location information, an authentication identifier, and a delivery distance threshold into a query request, and sends the query request to a server; and after receiving information, which is fed back by the server, about a target order that is within a delivery distance threshold of a current location, the logistics terminal sends an arrival notice instruction to the server to instruct the server to push, according to an ordering user account in the target order, online prompt information that includes the current location information of the logistics terminal and logistics delivery information to a corresponding ordering user terminal, so as to simultaneously instruct multiple ordering users to pick up goods at a current location of the logistics terminal, thereby achieving objectives of improving goods delivery efficiency and reducing a delivery cost.

Further, the logistics terminal may further include a first presenting module configured to display, according to the order information, a delivery address corresponding to an ordering user and a current location corresponding to the logistics terminal to a logistics delivery person by using a map.

Further, the logistics terminal may further include a determining result receiving module configured to receive a result of determining whether a current location corresponding to the ordering user terminal matches the delivery address in the target order fed back by the server; and a second presenting module configured to differentially display an ordering user whose current location and delivery address are matched and an ordering user whose current location and delivery address are not matched to the logistics delivery person by using a map.

For the apparatus or system embodiments, since they are basically corresponding to the method embodiments, for relevant parts, reference may be made to the parts of the description of the method embodiments. The apparatus or system embodiment described above is merely exemplary, where the units described as separate parts may or may not be physically separate, and parts displayed as units may or may not be physical units, may be located in one position, or may be distributed on a plurality of network units. A part or all of the modules may be selected according to an actual need to achieve the objectives of the solutions of the embodiments. A person of ordinary skill in the art may understand and implement the embodiments without creative efforts.

In the several embodiments provided in the present invention, it should be understood that the disclosed system, apparatus, and method may be implemented in other manners without going beyond the spirit and scope of the present application. The present embodiments are merely exemplary, but are not intended to limit the protection scope of the present application. For example, the unit or subunit division is merely logical function division and may be other division in actual implementation. For example, a plurality of units or subunits may be combined. In addition, a plurality of units or components may be combined or integrated into another system, or some features may be ignored or not performed.

Furthermore, the described system, apparatus, method, and schematic diagrams of various embodiments, may be combined or integrated with another system, module, technology, or method. In addition, the displayed or discussed mutual couplings or direct couplings or communication connections may be implemented through some interfaces. The indirect couplings or communication connections between the apparatuses or units may be implemented in electronic, mechanical, or other forms.

The foregoing descriptions are merely specific implementation manners of the present invention. It should be noted that a person of ordinary skill in the art may make certain improvements or polishing without departing from the principle of the present invention and the improvements or polishing should fall within the protection scope of the present invention.

What is claimed is:

1. An information processing method implemented by a server, comprising:
receiving a query request from a logistics terminal, wherein the query request comprises information for each of a current location of the logistics terminal, a delivery distance threshold of the current location of the logistics terminal, and an authentication identifier of the logistics terminal, wherein the authentication identifier is an identifier assigned to the logistics terminal, and wherein the delivery distance threshold of the current location of the logistics terminal comprises a preset delivery distance between the current location of the logistics terminal and a delivery address associated with at least one prestored order;
querying the at least one prestored order using the information in the query request;
determining information in a target order of the at least one prestored order that corresponds to the authentication identifier of the logistics terminal, wherein the information in the target order comprises the delivery address within the delivery distance threshold of the current location of the logistics terminal, wherein the delivery distance threshold uses the current location as a center, and wherein the target order comprises a communication identifier associated with an ordering user terminal, an ordering user account associated with the ordering user terminal, and the delivery address, and wherein a schedule of the target order is obtained based on the current location of the logistics terminal;
sending the target order to the logistics terminal when the information in the target order comprises the authentication identifier of the logistics terminal and the delivery address is within the delivery distance threshold; and
pushing online prompt information via a text message over a communication channel to the ordering user terminal according to the communication identifier associated with the target order after an arrival notice instruction is received from the logistics terminal and when the ordering user account associated with the ordering user terminal is offline, and wherein the online prompt information in the text message comprises:
  information for the current location of the logistics terminal and logistics delivery information;
  information to cause the delivery address to be displayed on the ordering user terminal; and
  information providing an indication to the ordering user terminal that the ordering user terminal is offline to the server and to prompt the ordering user terminal to connect to the server through the ordering user account so as to obtain the information in the target order.

2. The information processing method of claim 1, wherein the delivery address in the target order is a fixed address.

3. The information processing method of claim 1, wherein the delivery address in the target order is a location corresponding to the ordering user terminal during shopping.

4. The information processing method of claim 1, wherein pushing the online prompt information to the ordering user terminal comprises pushing the online prompt information as the text message to the ordering user terminal.

5. The information processing method of claim 1, wherein the online prompt information further comprises the delivery address corresponding to the ordering user account, and after receiving the online prompt information pushed by the server, the ordering user terminal is further configured to:
  obtain the current location corresponding to the ordering user terminal;
  determine whether the current location matches the delivery address; and
  feed back a result of the determining to the server.

6. The information processing method of claim 5, further comprising:
  receiving the result of the determining whether the current location matches the delivery address, wherein the result of the determining is fed back to the ordering user terminal; and
  pushing the result of the determining to the logistics terminal.

7. The information processing method of claim 6, wherein the target order comprises the communication identifier associated with the ordering user terminal, and wherein the method further comprises sending a Short Message Service (SMS) message to the ordering user terminal associated with the communication identifier when the ordering user account is offline.

8. An information processing method, comprising:
  obtaining information of a current location of a logistics terminal;
  encapsulating information for each of the current location of the logistics terminal, an authentication identifier of the logistics terminal, and a delivery distance threshold of the logistics terminal into a query request;
  sending the query request to a server, wherein the authentication identifier is an identifier assigned to the logistics terminal, and wherein the delivery distance threshold of the logistics terminal comprises a preset delivery distance between the current location of the logistics terminal and a delivery address associated with at least one prestored order;
  receiving information in a target order that corresponds to the authentication identifier and comprising a delivery address within the delivery distance threshold of the current location of the logistics terminal, wherein information in the target order is received from the server and comprises a communication identifier associated with an ordering user terminal, an ordering user account associated with the ordering user terminal, the delivery address, and wherein a schedule of the target order is obtained based on the current location of the logistics terminal; and
  sending an arrival notice instruction to the server, wherein the arrival notice instruction is used to instruct the server to push online prompt information via a text message over a communication channel to the ordering user terminal according to the communication identifier associated with the target order when the ordering user account associated with the ordering user terminal is offline, and wherein the online prompt information in the text message comprises:
    information for the current location of the logistics terminal and logistics delivery information;
    information to cause the delivery address to be displayed on the ordering user terminal; and
    information providing an indication to the ordering user terminal that the ordering user terminal is offline to the server and to prompt the ordering user terminal to connect to the server through the ordering user account so as to obtain the information in the target order.

9. The information processing method of claim 8, further comprising displaying, according to information in the target order, the delivery address corresponding to an ordering user and the current location of the logistics terminal to a logistics delivery person using a map.

10. The information processing method of claim 8, further comprising:
  receiving a result of determining whether the current location corresponding to the ordering user terminal matches the delivery address in the target order received from the server;
  displaying, on a map, information on an ordering user whose current location and the delivery address are matched to information on a logistics delivery person; and
  displaying, on the map, an ordering user whose current location and the delivery address are not matched to information on the logistics delivery person.

11. A logistics terminal, comprising:
  a memory comprising instructions; and
  a processor coupled to the memory, the instructions causing the processor to be configured to:
    obtain information on a current location of the logistics terminal;
    encapsulate information for each of the current location of the logistics terminal, an authentication identifier of the logistics terminal, and a delivery distance threshold of the logistics terminal into a query request;
    send the query request to a server, wherein the authentication identifier is an identifier assigned to the logistics terminal, and wherein the delivery distance threshold of the logistics terminal comprises a preset delivery distance between the current location of the logistics terminal and a delivery address associated with a target order;
    receive information in the target order that corresponds to the authentication identifier of the logistics terminal and comprising a delivery address within a delivery distance threshold of the current location of the logistics terminal, wherein information in the target order is received from the server and comprises a communication identifier associated with an ordering user terminal, an ordering user account associated with the ordering user terminal, and the delivery address, and wherein a schedule of the target order is obtained based on the current location of the logistics terminal;

send an arrival notice instruction to the server, wherein the arrival notice instruction is used to instruct the server to push online prompt information via a text message over a communication channel to the ordering user terminal according to the communication identifier associated with the target order when the ordering user account associated with the ordering user terminal is offline, and wherein the online prompt information in the text message comprises:
information for the current location of the logistics terminal and delivery information;
information to cause the delivery address to be displayed on the ordering user terminal; and
information providing an indication to the ordering user terminal that the ordering user terminal is offline to the server and to prompt the ordering user terminal to connect to the server through the ordering user account so as to obtain the information in the target order.

12. The logistics terminal of claim 11, wherein the instructions further cause the processor to be configured to display, according to information in the target order, the delivery address corresponding to an ordering user and the current location of the logistics terminal to a logistics delivery person using a map.

13. The logistics terminal of claim 11, wherein the instructions further cause the processor to be configured to:
receive a result of determining whether a current location corresponding to the ordering user terminal matches the delivery address in the target order received from the server;
display, on a map, information on an ordering user whose current location and the delivery address are matched to information on a logistics delivery person; and
display, on the map, an ordering user whose current location and the delivery address are not matched to information on the logistics delivery person.

14. An information processing method, comprising:
obtaining, by a mobile phone, information on a current location of the mobile phone using a built-in Global Positioning System (GPS) module of the mobile phone;
sending, by the mobile phone, a query request to a server, wherein the query request comprises the current location of the mobile phone, an authentication identifier, and a delivery distance threshold, wherein the authentication identifier is an identifier assigned to a logistics terminal, and wherein the delivery distance threshold comprises a preset delivery distance between the current location of the mobile phone and a delivery address associated with at least one prestored order;
receiving, by the server, the query request from the mobile phone;
authenticating, by the server, the mobile phone using the authentication identifier in the query request;
determining, by the server, target order information in the at least one prestored order when the authentication succeeds, wherein the target order information corresponds to the authentication identifier and comprises a communication identifier associated with the mobile phone and a delivery addresses within a delivery distance threshold range that uses the current location of the mobile phone as a center, wherein the delivery addresses comprises a first delivery address that corresponds to a first ordering user account of a first terminal in the target order information and a second delivery address that corresponds to a second ordering user account of a second terminal in the target order information, and wherein a schedule of the target order is obtained based on the current location of the logistics terminal;
sending, by the server, the target order information to the first terminal;
receiving, by the first terminal, the target order information;
sending, by the mobile phone, an arrival notice instruction to the server, wherein the arrival notice instruction is used to instruct the server to push online prompt information to the first terminal according to the first ordering user account and to the second terminal according to the second ordering user account;
receiving, by the server, the arrival notice instruction from the mobile phone;
pushing, by the server, online prompt information via a text message over a communication channel to the first terminal and the second terminal according to the communication identifier after an arrival notice instruction is received by the server, wherein the online prompt information includes the current location of the mobile phone, logistics delivery information, the first delivery address and the second delivery address, wherein the online prompt information is pushed via the text message when one or more of the first ordering user account or the second ordering user account are offline to the server, wherein the online prompt information providing an indication that at least one of the first terminal or the second terminal is offline to the server, wherein the text message causes the first delivery address and the second delivery address to display on the one or more of the first terminal and the second terminal and to prompt the one or more of the first terminal and the second terminal to connect to the server through the one or more of the first ordering user account or the second ordering user account so as to obtain the target order information;
receiving, by the first terminal, the online prompt information from the server,
receiving, by the second terminal, the online prompt information from the server,
determining, by the first terminal, whether the current location of the first terminal matches the first delivery address, and sending a first result of the determining to the server;
determining, by the second terminal, whether the current location of the second terminal matches the second delivery address, and sending a second result of the determining to the server,
receiving, by the server, the first result of the determining sent by the first terminal and the second result of the determining sent by the second terminal;
pushing, by the server, the first result and the second result of the determining to the mobile phone;
receiving, by the mobile phone, the first result and the second result of the determining; and
differentially displaying, by the mobile phone, the first terminal and the second terminal in a map on a display of the mobile phone, wherein the map indicates that the current location of the first terminal does not match the first delivery address and the current location of the second terminal matches the second delivery address.

\* \* \* \* \*